US011159581B2

(12) United States Patent
Amin et al.

(10) Patent No.: US 11,159,581 B2
(45) Date of Patent: Oct. 26, 2021

(54) DYNAMIC SESSION INITIATION PROTOCOL PEERING CONFIGURATION

(71) Applicant: T-Mobile USA, Inc., Bellevue, WA (US)

(72) Inventors: Rahul Amin, Issquah, WA (US); Muhilan Vamadevan, Bellevue, WA (US); Joel Arends, Renton, WA (US); Tharunika Sridhar, Redmond, WA (US); Rex Maristela, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 39 days.

(21) Appl. No.: 16/212,451

(22) Filed: Dec. 6, 2018

(65) Prior Publication Data

US 2020/0186574 A1 Jun. 11, 2020

(51) Int. Cl.
*H04L 29/06* (2006.01)
*H04L 12/751* (2013.01)
*H04W 8/18* (2009.01)
*H04W 72/04* (2009.01)

(52) U.S. Cl.
CPC .......... *H04L 65/1006* (2013.01); *H04L 45/02* (2013.01); *H04L 65/1073* (2013.01); *H04W 8/18* (2013.01); *H04W 72/0426* (2013.01)

(58) Field of Classification Search
CPC ................ H04W 8/18; H04W 72/0426; H04L 65/1073; H04L 45/02; H04L 65/1006
See application file for complete search history.

(56) References Cited

U.S. PATENT DOCUMENTS

| | | | |
|---|---|---|---|
| 2016/0352838 A1* | 12/2016 | Larkin | H04L 65/1006 |
| 2016/0366189 A1* | 12/2016 | Hart | H04L 43/0811 |
| 2017/0013025 A1* | 1/2017 | Shakhov | H04L 45/70 |
| 2017/0054642 A1* | 2/2017 | Kennedy | H04L 67/2819 |
| 2017/0251028 A1* | 8/2017 | Bollapalli | H04L 65/1006 |

\* cited by examiner

Primary Examiner — Jackie Zuniga Abad
(74) Attorney, Agent, or Firm — Han Santos, PLLC

(57) ABSTRACT

Aspects of the present disclosure include techniques for dynamically exchanging session initiation protocol (SIP) configurations between a SIP node and a neighbor SIP node. For example, a SIP node may send a first request to the neighbor SIP node to subscribe to neighbor SIP node configurations. The SIP node may then receive a second request from the neighbor SIP node for the neighbor SIP node to subscribe to SIP node configurations. The SIP node then sends the SIP node configurations from the SIP node to the neighbor SIP node and receives the neighbor SIP node configurations from the neighbor SIP node. In some aspects, the SIP node may store the neighbor SIP node configurations to a data store for formatting subsequent SIP messages exchanged between the SIP node and the neighbor SIP node.

16 Claims, 12 Drawing Sheets

1X EV-DO EXAMPLE

*UMTS / W-CDMA EXAMPLE #1*

UMTS / W-CDMA EXAMPLE #2

*LTE EXAMPLE* eHRPD EXAMPLE

*IMS ARCHITECTURE EXAMPLE*

DYNAMIC SESSION INITIATION PROTOCOL PEERING CONFIGURATION

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM and includes contributions from various GSM-related protocols such as Enhanced Data rates for GSM Evolution (EDGE), and Universal Mobile Telecommunications System (UMTS) protocols such as High-Speed Packet Access (HSPA).

Access networks using various communication protocols (e.g., 3GPP access networks such as W-CDMA, LTE, etc., or non-3GPP access networks such as WiFi, WLAN or wired LAN, etc.) can be configured to provide Internet Protocol (IP) Multimedia Subsystem (IMS) services to users via an IMS core in a network managed by a mobile network operator (e.g., T-MOBILE™). Users that access the IMS core to request an IMS service are assigned to one of a plurality of regional application servers or application server clusters (e.g., groups of application servers that serve the same cluster region) for supporting the requested IMS service.

In general, the session initiation protocol (SIP) is the signaling protocol for Global VOIP and other related IMS services like Short Messaging Service (SMS), online chat service, file transfer, etc. The End to End (E2E) SIP call flow packet traverses across the Internet and is processed by many SIP nodes, where each of the SIP nodes may be controlled/maintained by separate and distinct service providers. This means that participating SIP nodes are configured with one another's capabilities in terms of SIP headers, parameters, values, etc. Typically, each individual SIP node is manually configured where the SIP peering inter-operability between Service Providers (SP) SIP nodes is then tested and validated before a live service can be deployed.

This kind of siloed configuration and SIP parametric modifications slows down real time provisioning and deploying of new communication services. Often, it can take months to configure and adjust parameters among different service provider SIP nodes before new features and functionalities can be implemented in the network.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Figure 1:
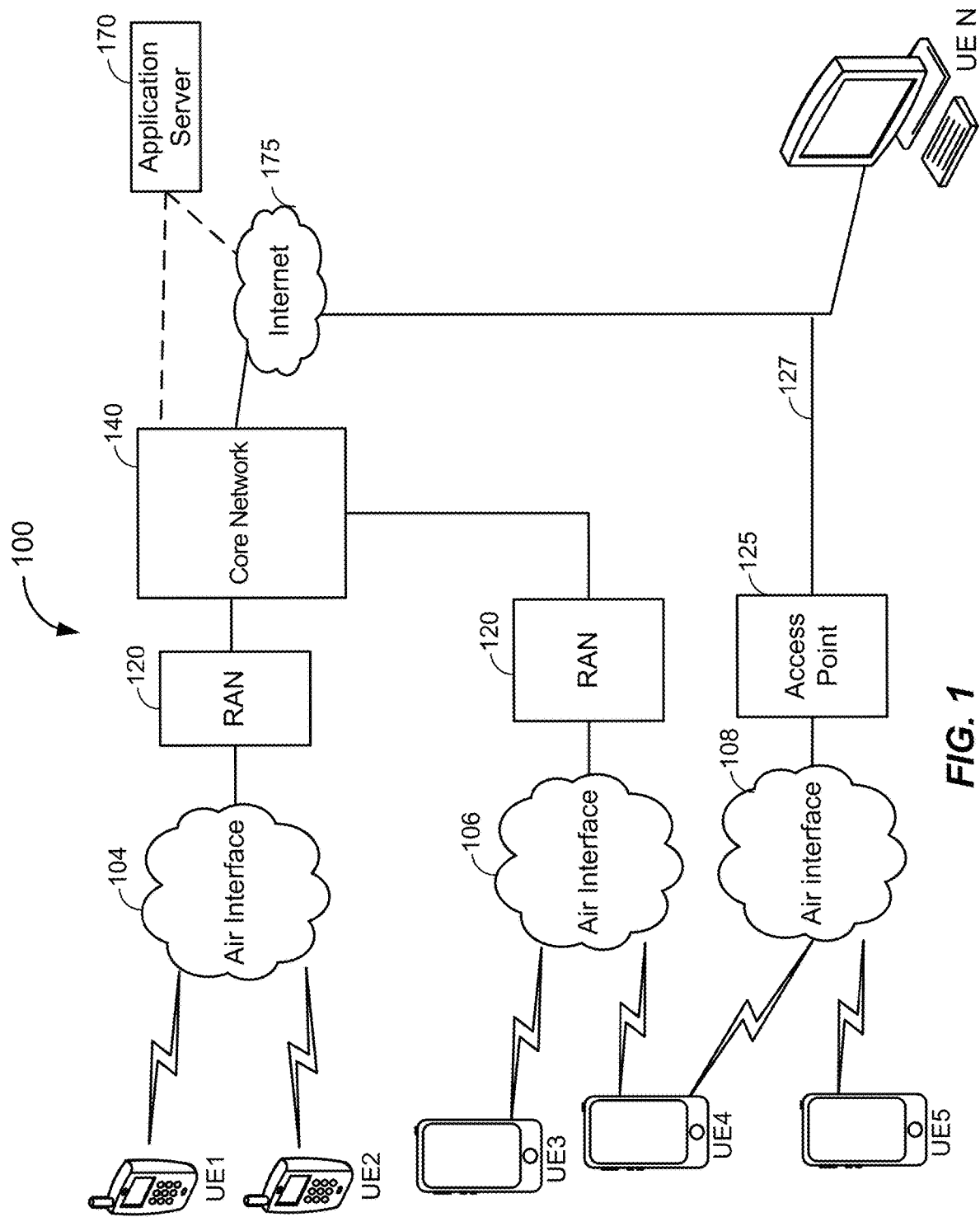
FIG. 1 illustrates a high-level system architecture of a wireless communications system that supports dynamic session protocol peering configuration.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel FIG. 1 illustrates a high-level system architecture of a wireless communications system 100 in accordance with aspects of the present disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct connection 127. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over direct connection 127 that may include an Ethernet connection, WiFi, or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as direct connection 127 to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 correspond to components associated with supporting packet-switched (PS) communications, whereby legacy circuit-switched (CS) components may also be present in these networks, but any legacy CS-specific components are not shown explicitly in FIGS. 2A-2D.

Figure 2A:
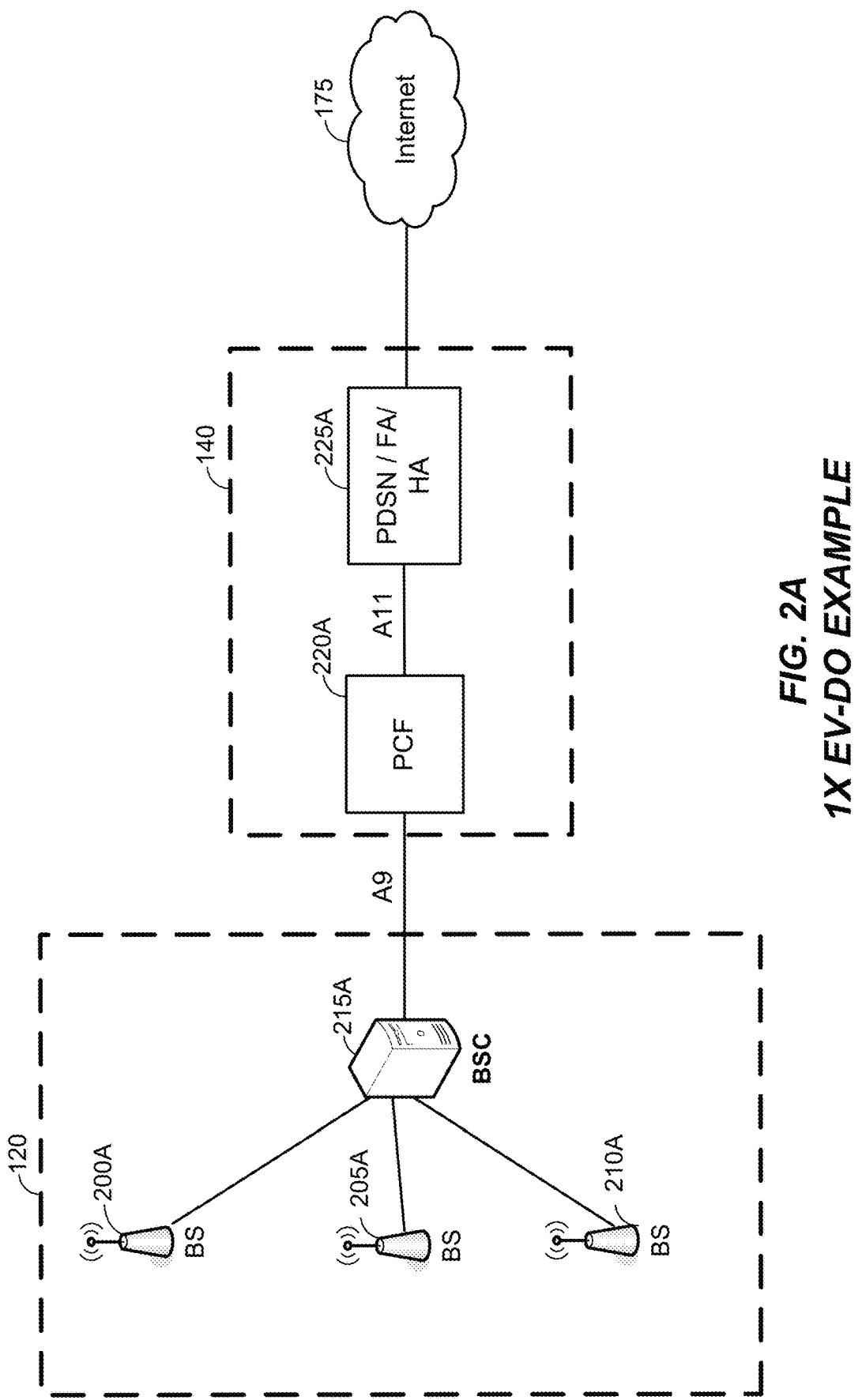
FIG. 2A illustrates an example configuration of a radio access network (RAN) and a packet-switched portion of a core network for a 1x EV-DO network.

FIG. 2A illustrates an example configuration of the RAN 120 and the core network 140 for packet-switched communications in a CDMA2000 1x Evolution-Data Optimized (EV-DO) network in accordance with aspects of the present disclosure. As shown in FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
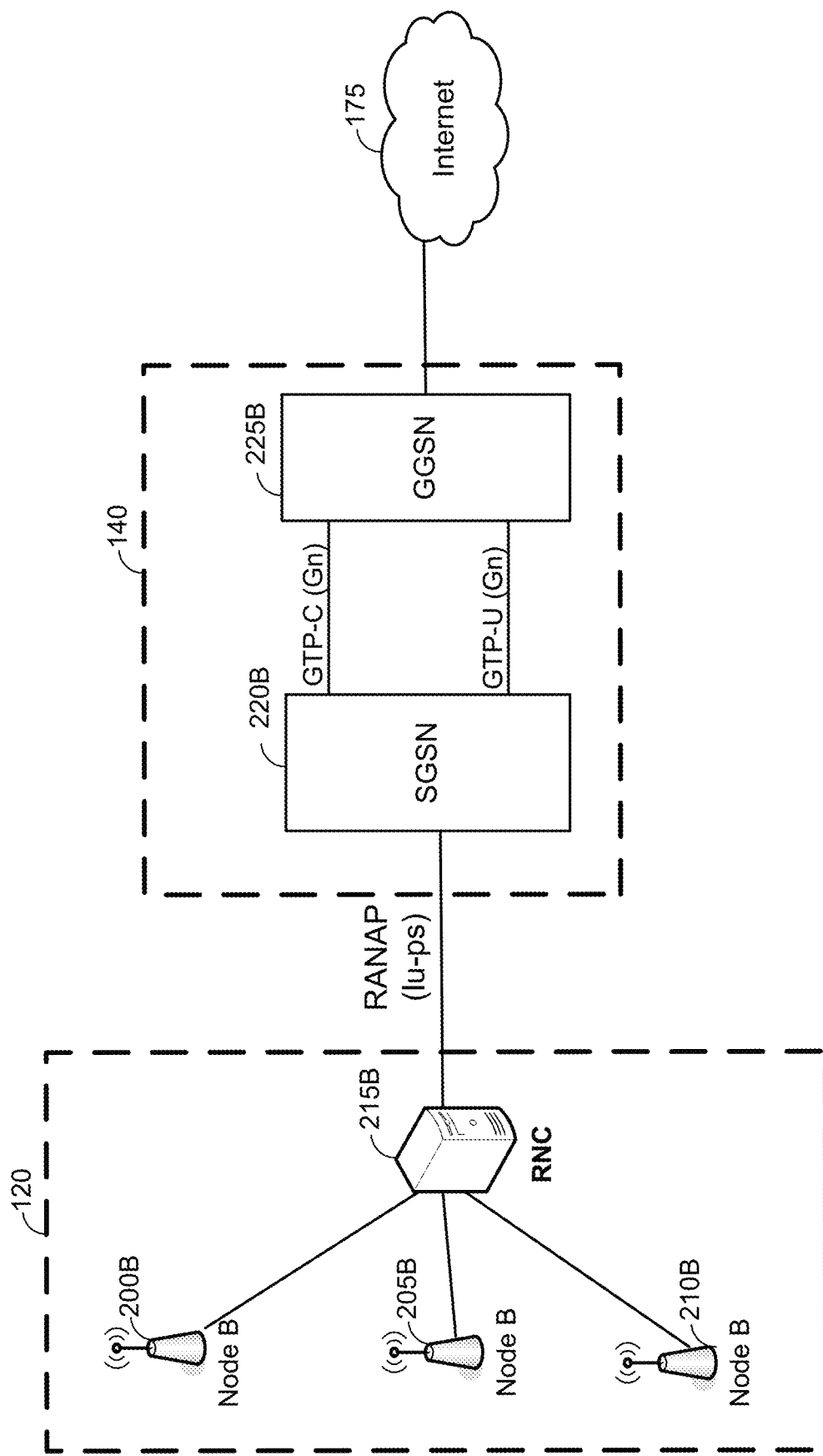
FIG. 2B illustrates an example configuration of the RAN and a packet-switched portion of a General Packet Radio Service (GPRS) core network within a 3G UMTS W-CDMA system.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. The RAN 120 can include multiple RNCs and subnets, whereas a single RNC is shown in FIG. 2B for the sake of convenience. The RNC 215B is responsible for signaling, establishing and tearing down bearer channels (i.e., data channels) between a Serving GPRS Support Node (SGSN) 220B in the core network 140 and UEs served by the RAN 120. If link layer encryption is enabled, the RNC 215B also encrypts the content before forwarding it to the RAN 120 for transmission over an air interface.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP may be used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., Home Location Register). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current Visitor Location Register (VLR)) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. Aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
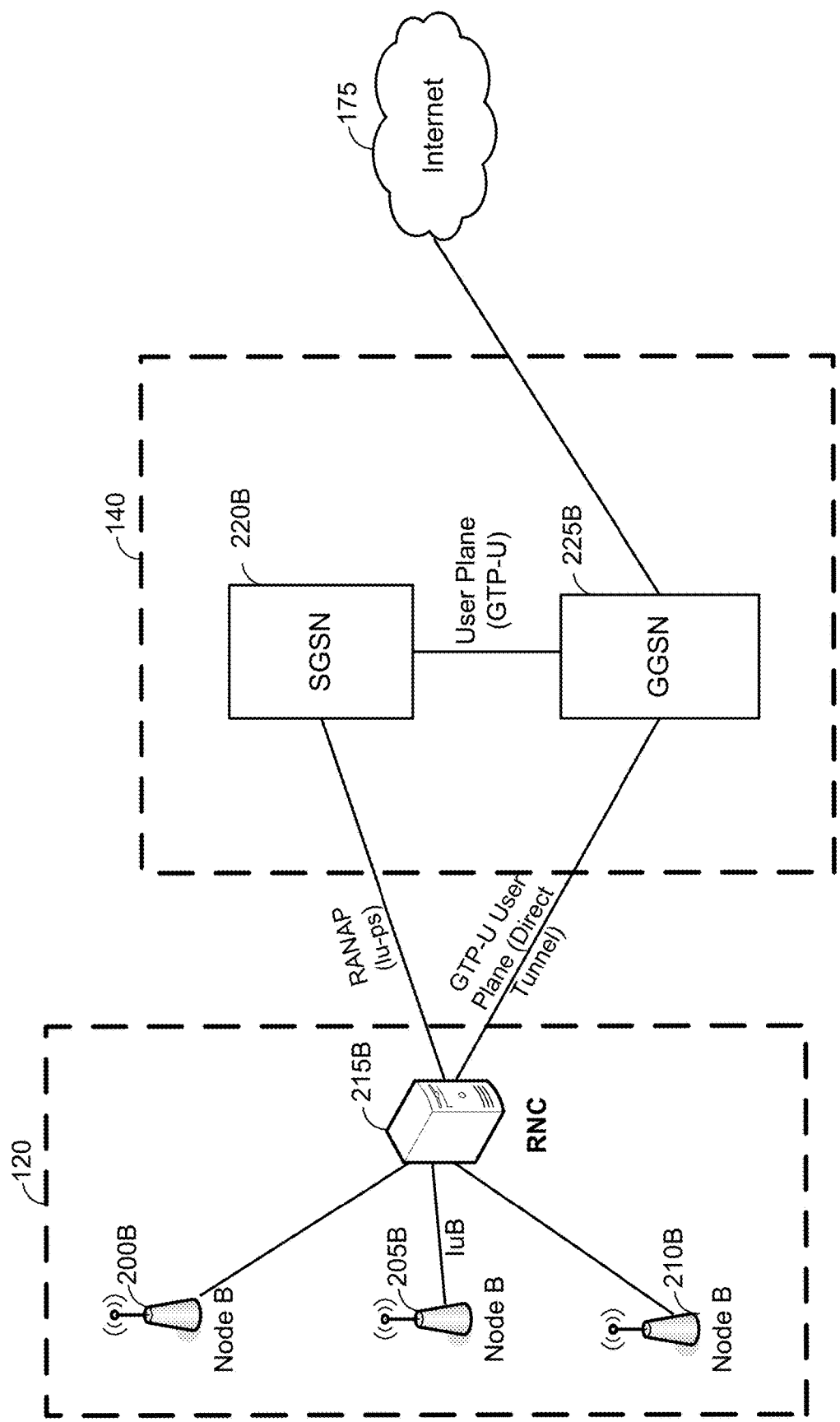
FIG. 2C illustrates another example configuration of the RAN and a packet-switched portion of a GPRS core network within a 3G UMTS W-CDMA system.

FIG. 2C illustrates another example configuration of the RAN 120 and a packet-switched portion of the core network 140 that is configured as a GPRS core network within a 3G UMTS W-CDMA system in accordance with aspects of the present disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. In operation, a GTP-U tunnel is established between the GGSN 225B and SGSN 220B in order to be able to handle the downlink packets.

Figure 2D:
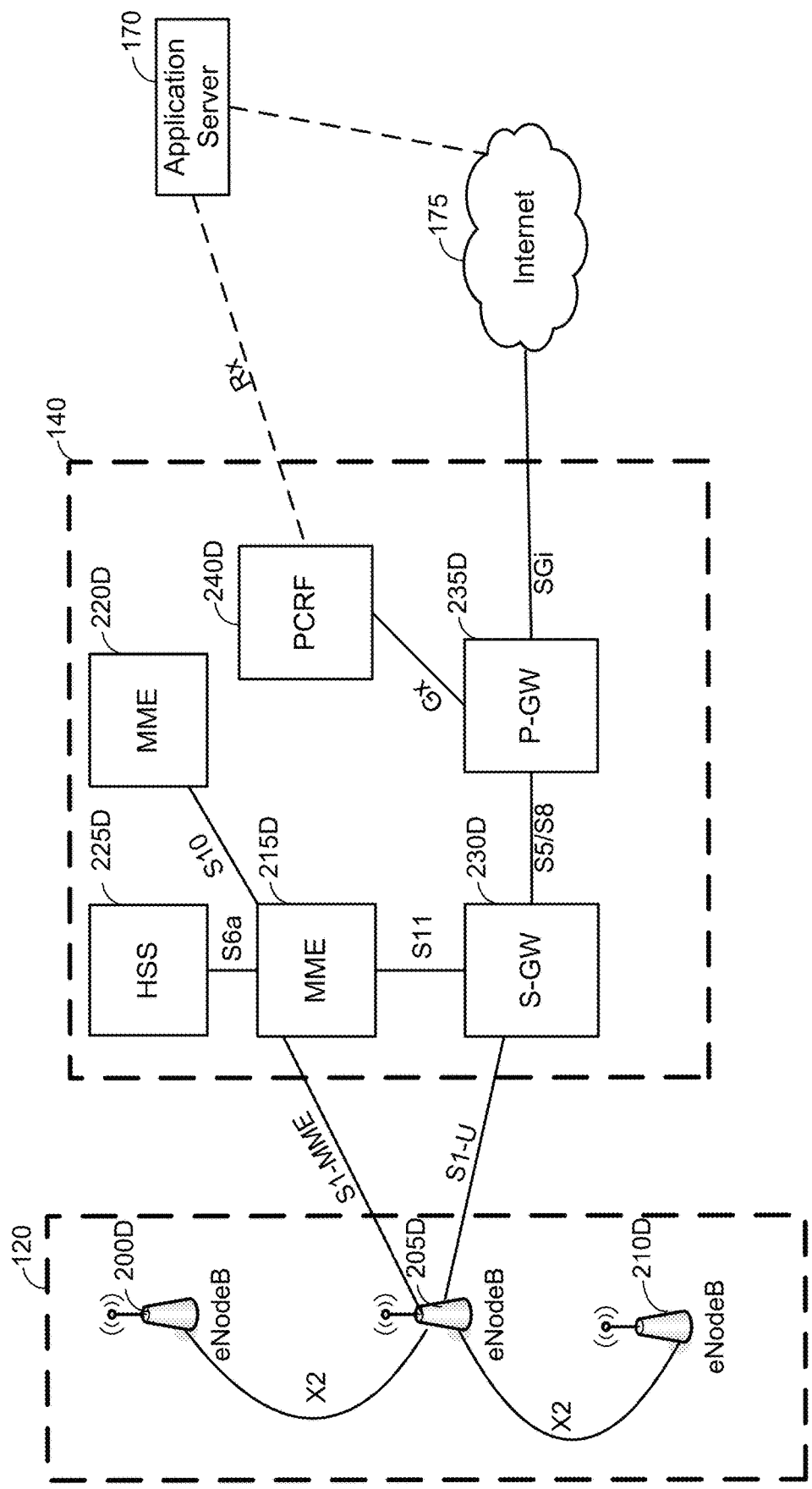
FIG. 2D illustrates an example configuration of the RAN and a packet-switched portion of the core network that is based on an Evolved Packet System (EPS) or Long Term Evolution (LTE) network.

FIG. 2D illustrates an example configuration of the RAN 120 and a packet-switched portion of the core network 140 based on an Evolved Packet System (EPS) or LTE network, in accordance with aspects of the present disclosure. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks may not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy and Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
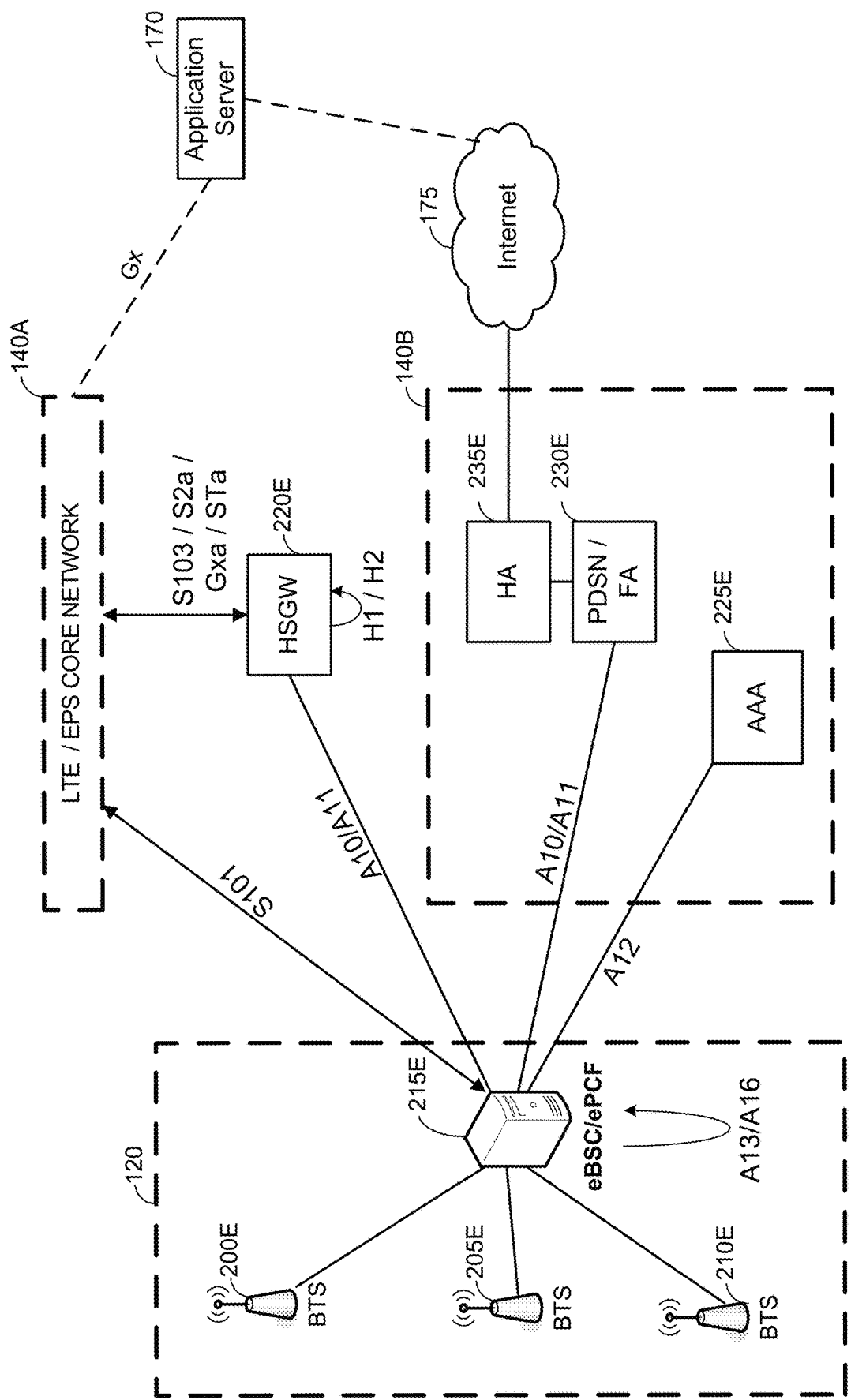
FIG. 2E illustrates an example configuration of an enhanced High Rate Packet Data (HRPD) RAN connected to an EPS or LTE network and also a packet-switched portion of an HRPD core network.

FIG. 2E illustrates an example of the RAN 120 configured as an enhanced High Rate Packet Data (HRPD) RAN connected to an EPS or LTE network 140A and also a packet-switched portion of an HRPD network 140B in accordance with aspects of the present disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HS-GW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HS-GW 220E is defined in 3GPP2 to provide the interworking between HRPD networks and EPS/LTE networks. As will be appreciated, the eHRPD RAN and the HS-GW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A.

For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HS-GWs (e.g., FIG. 2E) can support network-initiated Quality of Service (QoS) (e.g., by the P-GW, GGSN, SGSN, etc.) in certain cases.

Figure 3:
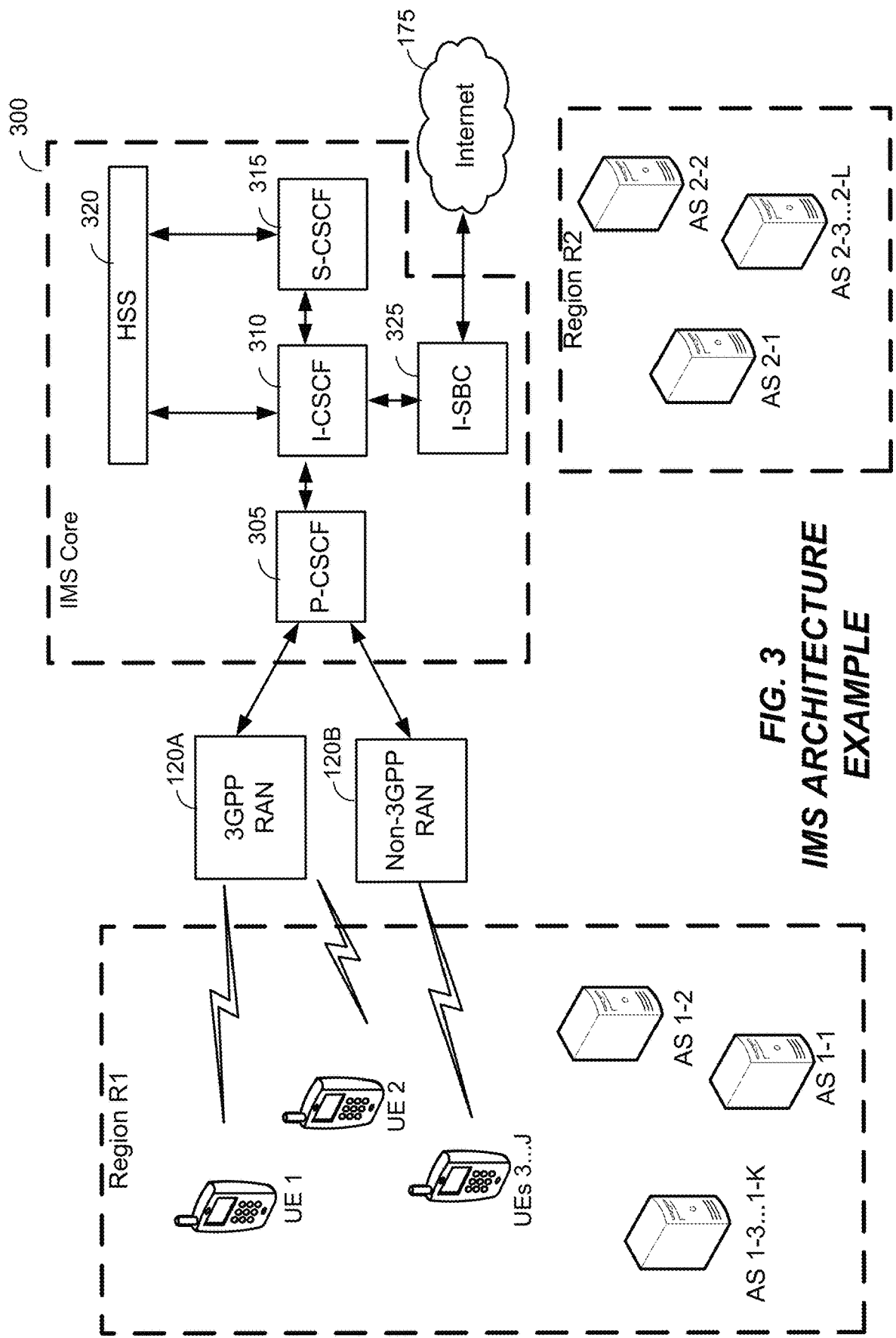
FIG. 3 illustrates an example of an Internet Protocol (IP) multimedia subsystem (IMS) session architecture.

FIG. 3 illustrates an example of IMS architecture in accordance with aspects of the present disclosure. Referring to FIG. 3, assume that a first cluster of application servers denoted as 1-1, AS 1-2 . . . AS 1-K is configured to provide IMS service to UEs and is located (or deployed) in a first region, and that a second cluster of application servers denoted as AS 2-1, AS 2-2 . . . AS 2-L is configured to provide IMS service to UEs is located (or deployed) in a second region. While not shown in FIG. 3 explicitly, other clusters of application servers can be deployed in other cluster regions as well. In FIG. 3, each cluster of application servers is assumed to be operated by the same mobile network operator (e.g., T-MOBILE™). In FIG. 3, UEs 1 . . . J are assumed to be operating in cluster region R1 and are configured to connect either to a 3GPP RAN 120A (e.g., any of RANs 120 from FIGS. 2A-2E) or a non-3GPP RAN 120B (e.g., a wired Ethernet connection, a WiFi connection such as AP 125, etc.). UEs 1 . . . J can then connect to an IMS core 300 through either the 3GPP RAN 120A or the non-3GPP RAN 120B.

Referring to FIG. 3, the IMS core 300 is shown as illustrating a particular set of IMS components, including a proxy call session control function (P-CSCF) 305, an interrogating CSCF (I-CSCF) 310, a serving CSCF (S-CSCF) 315, a Home Subscriber Server (HSS) 320, and a session border controller SBC (I-SBC) 325. The P-CSCF 305, I-CSCF 310 and S-CSCF 315 are sometimes referred to collectively as the CSCF, and the CSCF is responsible for signaling via Session Initiation Protocol (SIP) between the Transport Plane, Control Plane, and the Application Plane of the IMS core 300.

Referring to the P-CSCF 305 of FIG. 3, the P-CSCF 305 is responsible for interfacing directly with Transport Plane components and may be the first point of signaling within the IMS core 300 for any end-point, such as UEs 1 . . . J. Once an endpoint acquires IP connectivity, the end point will cause a registration event to occur by first signaling to the P-CSCF 305. As the name implies, the P-CSCF 305 is a proxy for SIP messages from end-points to the rest of the IMS core 300. It is usually in a home network of the end point, but may reside in a visited network of the end point. The P-CSCF 305 may use a DNS look-up to identify a target I-CSCF 310 to send SIP messages, which could be an I-CSCF 310 in its own network or another I-CSCF across an administrative domain. The P-CSCF 305 can also be responsible for policy decisions (e.g., via an integrated or stand-alone Policy Decision Function (PDF) in Releases 5 or 6 of IMS, via a Policy Charging, and Resource Function (PCRF) in Release 7 of IMS, etc.).

Figure 6:
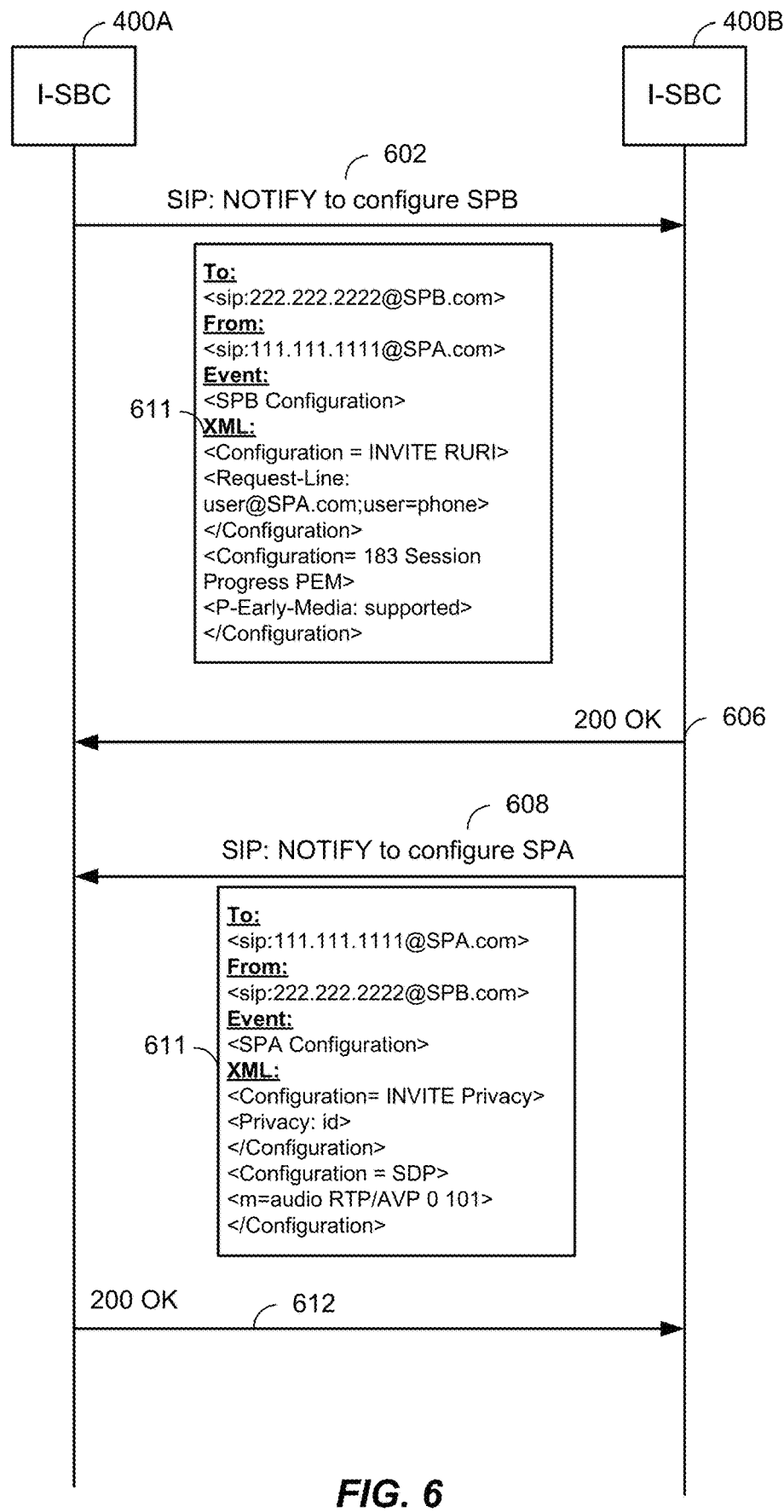

Referring to the I-CSCF 310 of FIG. 6, the main function of the I-CSCF 310 is to proxy between the P-CSCF 305 as entry point and S-CSCF 315 as control point for applications found in the Applications Plane. When the P-CSCF 305 receives a registration request SIP message, it will perform a DNS look-up to discover the appropriate I-CSCF 310 to route the message. Once the I-CSCF 310 receives the SIP message, it may perform a look-up operation with the HSS 320 via Diameter to determine the S-CSCF 315 that is associated with the end-point terminal. Once it receives this information, it will forward the SIP message to the appropriate S-CSCF 315 for further treatment.

Referring to the S-CSCF 315, the S-CSCF 315 is responsible for interfacing with the Application Servers (AS) (e.g., such as application servers 1-1, 1-2 . . . 1-K in cluster region R1, or application servers 2-1, 2-2 . . . 2-L in cluster region 2, and so on) in the Application Plane. Upon receiving a registration request SIP message from an I-CSCF 310, the S-CSCF 315 may query the HSS 320 via Diameter protocol to register the terminal as being currently served by itself. Subsequent session establishment requires knowing which S-CSCF 315 is responsible for the terminal session control. As part of the registration process, the S-CSCF 315 uses credentials it obtains from the query to the HSS 320 to issue an SIP message "challenge" back to the initiating P-CSCF 305 to authenticate the terminal.

In addition to acting as a registrar, the S-CSCF 315 is also responsible for routing SIP messages to the AS allowing for the Control Plane session control to interact with the Application Plane application logic. To do this, the S-CSCF 315 uses information obtained from the HSS 320 in the form of Initial Filter Criteria (IFC) that acts as triggers against inbound session establishment requests. The IFC includes rules that define how and where SIP messages should be routed to the various application servers that may reside in the Application Plane. The S-CSCF 315 may also act on Secondary Filter Criteria (SFC) obtained from the application servers during the course of messaging with them.

Referring to FIG. 3, a UE that requests IMS service (e.g., registration to set-up or join a VoIP session, a PTT session, a group communication session, etc.) from the IMS core 300 is assigned (or registered) to a target application server that is selected by the S-CSCF 315, as noted above. Generally, the IMS core 300 will attempt to select, as the target application server, an application server that is physically close to the UE and is also known to be capable of providing the requested IMS service.

Also shown in FIG. 3, is I-SBC 325. In some instances, I-SBC 325 may be included in IMS core 300 and inserted into the signaling and/or media paths between calling and called parties in a VoIP call, predominantly those using the Session Initiation Protocol (SIP), H.323, and MGCP call-signaling protocols.

In some instances, I-SBC 325 is configured to hide the network topology and protect the service provider or enterprise packet networks. The I-SBC 325 may terminate an inbound call and initiate the second call leg to the destination party. When used with the SIP protocol, this may define a back-to-back user agent (B2BUA). The effect of this behavior is that not only the signaling traffic, but also the media traffic (voice, video) is controlled by the I-SBC 325. In cases where the I-SBC 325 does not have the capability to provide media services, I-SBC 325 may also redirect media traffic to a different element elsewhere in the network, for recording, generation of music-on-hold, or other media-related purposes.

In other cases, the I-SBC 325 may modify the stream of call control (signaling) data involved in each call, such as limiting the kinds of calls that can be conducted, changing the codec choices, and so on. Ultimately, I-SBC 325 allows the network operators to manage the calls that are made on their networks, fix or change protocols and protocol syntax to achieve interoperability, and also overcome some of the problems that firewalls and network address translators (NATs) present for VoIP calls.

To show the operation of I-SBC 325, one can compare a simple call establishment sequence with a call establishment sequence with I-SBC 325. In one example session establishment sequence with only one proxy between the user agents, the proxy's task is to identify the callee's location and forward the request. The proxy also adds a Via header with its own address to indicate the path that the response should traverse. The proxy does not change any dialog identification information present in the message such as the tag in the From header, the Call-Id or the Cseq. Proxies also do not alter any information in the SIP message bodies. Note that during the session initiation phase the user agents exchange SIP messages with the SDP bodies that include addresses at which the agents expect the media traffic. After successfully finishing the session initiation phase the user agents can exchange the media traffic directly between each other without the involvement of the proxy.

In some aspects, I-SBC 325 is configured to support many applications and may be used by operators and enterprises to achieve a variety of goals. For example, most I-SBC 325 may be configured as back-to-back user agent. A B2BUA is a proxy-like server that splits a SIP transaction in two call legs: on the side facing the user agent client (UAC), it acts as server, on the side facing user agent server (UAS) it acts as a client. While a proxy usually keeps only state information related to active transactions, B2BUAs keep state information about active dialogs, e.g., calls. That is, once a proxy receives a SIP request it will save some state information. Once the transaction is over, e.g., after receiving a response, the state information will soon after being deleted. A B2BUA will maintain state information for active calls and only delete this information once the call is terminated.

When I-SBC 325 is included in the call path, the I-SBC 325 acts as a B2BUA that behaves as a user agent server towards the caller and as user agent client towards the callee. In this sense, the I-SBC 325 actually terminates that call that was generated by the caller and starts a new call towards the callee. The INVITE message sent by the I-SBC 325 may thus not include a clear reference to the caller. The INVITE sent by the I-SBC 325 to the proxy includes Via and Contact headers that point to the I-SBC 325 itself and not the caller. The I-SBC 325 may also manipulate the dialog identification information listed in the Call-Id and From tag. Further, in cases where the I-SBC 325 is configured to also control the media traffic then the I-SBC 325 also changes the media addressing information included in the c and m lines of the session description protocol (SDP) body. Thereby, not only will all SIP messages traverse the I-SBC 325 but also all audio and video packets. As the INVITE sent by the I-SBC 325 establishes a new dialog, the I-SBC 325 also manipulates the message sequence number (CSeq) as well as the Max-Forwards value. Note that the list of header manipulations listed here is only a subset of the possible changes that I-SBC 325 might introduce to a SIP message.

I-SBC 325 may be used by corporations along with firewalls and intrusion prevention systems (IPS) to enable VoIP calls to and from a protected enterprise network. VoIP service providers may use I-SBC 325 to allow the use of VoIP protocols from private networks with Internet connections using NAT, and also to implement strong security measures that are necessary to maintain a high quality of service. I-SBC 325 may also replace the function of application-level gateways. In larger enterprises, I-SBC 325 can also be used in conjunction with SIP trunks to provide call control and make routing/policy decisions on how calls are routed through the LAN/WAN. There are often tremendous cost savings associated with routing traffic through the internal IP networks of an enterprise, rather than routing calls through a traditional circuit-switched phone network.

Additionally, I-SBC 325 may be configured to allow VoIP calls to be set up between two phones using different VoIP signaling protocols (e.g., SIP, H.323,Megaco/MGCP) as well as performing transcoding of the media stream when different codecs are in use. In some implementations I-SBC 325 is configured to also provide firewall features for VoIP traffic (denial of service protection, call filtering, bandwidth management). Protocol normalization and header manipulation may also be provided by I-SBC 325, enabling communication between different vendors and networks.

In this regard, I-SBC 325 (as well as a corresponding core network) may be referred to as a "SIP Node", where I-SBC 325 is configured to exchange SIP messages with one or more neighbor SIP Nodes via an external network, such as internet 175. In some aspects, the neighbor SIP Nodes are owned, operated, and/or maintained by a service provider that is separate and distinct from the service provider that owns, operates, and/or maintains IMS core 300. As mentioned above, this requires that participating SIP nodes be configured with one another's capabilities in terms of SIP headers, parameters, values, etc. In some conventional systems, each individual SIP node must be manually configured where the SIP peering inter-operability between Service Providers (SP) SIP nodes is then tested and validated before a live service can be deployed.

Accordingly, aspects of the present disclosure relate communication between SIP nodes that will allow the exchange of SIP configurations dynamically and in real time. This exchanged configuration then can be used by the participating SIP nodes to build a data store (e.g., SIP Signaling Information Base (SIB)) that will contain all headers and parameters along with its relevant values necessary for SIP peering nodes to communicate with each other using any of the standard SIP methods.

Figure 4:
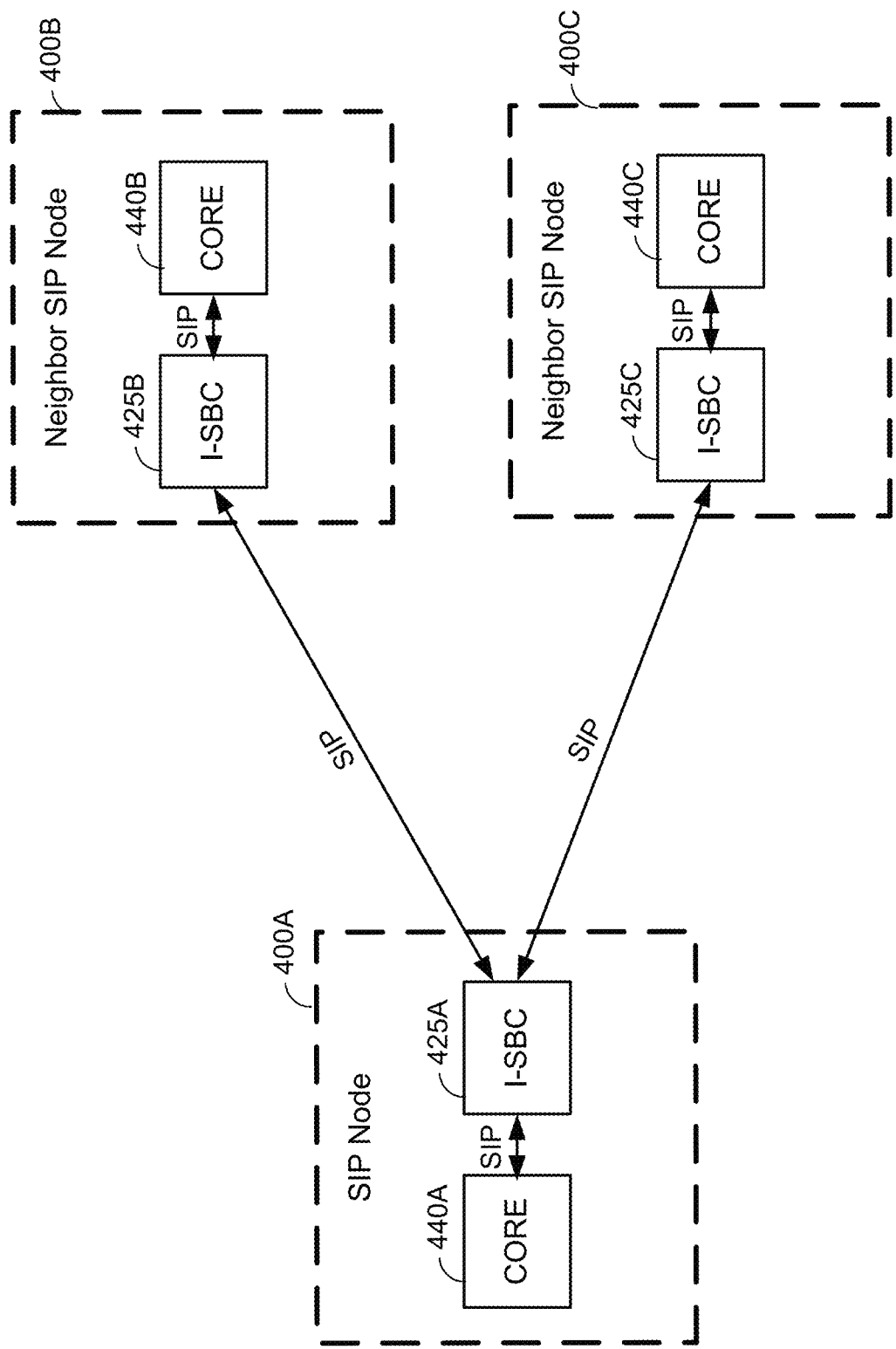
FIG. 4 illustrates the communication of SIP messages between various SIP nodes.

FIG. 4 illustrates the communication of SIP messages between various SIP nodes. In particular, FIG. 4 illustrates a SIP node 400A and several neighbor SIP nodes 400B, and 400C. Included in SIP node 400A is a core 440A and an I-SBC 425A. In some aspects SIP node 400A may be implemented as IMS core 300 of FIG. 3, where I-SBC 425A corresponds to I-SBC 325. Furthermore, core 440A may correspond to any of the core networks 140 illustrated in FIGS. 1-2E. Also shown in FIG. 4 are neighbor SIP nodes 400B and 400C. As discussed above, each neighbor SIP node may be owned, operated, and/or maintained by a service provider (e.g., mobile network operator) that is separate and distinct from the service provider that owns, operates, and/or maintains SIP node 400A.

In general, aspects of the present disclosure provide the ability for SIP Node 400A to exchange configurations with one or more neighbor SIP nodes (e.g., neighbor SIP nodes 400B and/or 400C) that will be used for processing subsequent SIP messages exchanged between the nodes. The configuration exchanged will be dynamic so that any configuration modification can be communicated and implemented in real time.

Accordingly, in some aspects, this entails that a neighbor relationship be established between SIP nodes so that each SIP node can dynamically advertise and receive configurations for SIP headers, parameters, etc. and build a datastore (e.g., SIB) for each neighbor SIP node. The exchanged configuration may be specific for each neighbor SIP node, directing that neighbor SIP node to use specific SIP headers and parameters in constructing SIP messages exchanged specifically between those two SIP nodes.

The establishment of a SIP Neighbor relationship between the SIP nodes may include dynamically exchanging SIP configurations that include SIP headers, parameters, etc. In some aspects, this configuration exchange may be done using SIP messages themselves, such as SIP SUBSCRIBE and SIP NOTIFY methods.

Figure 5:
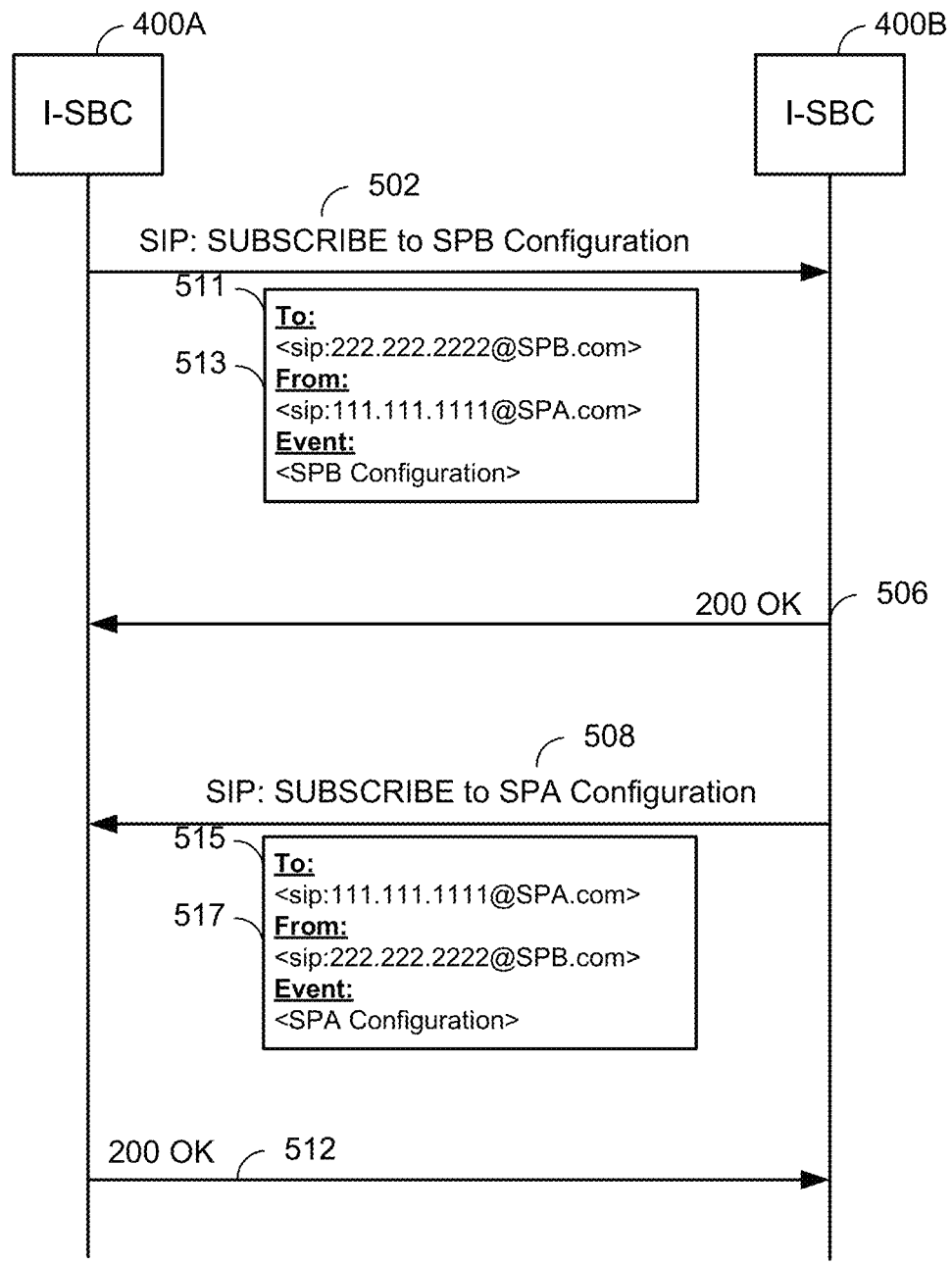
FIGS. 5 and 6 are call flow diagrams illustrating the establishment of a SIP neighbor relationship between SIP nodes.

For example, FIGS. 5 and 6 are call flow diagrams illustrating the establishment of a SIP neighbor relationship between SIP nodes.

In some aspects, each SIP node may be configured with a SIP node identifier (ID). The SIP node identifier may be an ID that is unique to each SIP node (e.g., I-SBC 425A may be assigned a first SIP node identifier and I-SBC 425B may be assigned a second SIP node identifier). In some examples, the SIP node identifier is a unique 10-digit ID using an mcc.mnc.xxx format, where mcc refers to the mobile country code and mnc refers to the mobile network code. In some aspects, the SIP node identifiers are neighbor/realm specific. That is, I-SBC 400A may be assigned a unique SIP node identifier for each neighbor SIP node that it forms a neighbor relationship with (i.e., I-SBC 400A may be assigned a first SIP node identifier for its neighbor relationship with I-SBC 400B and I-SBC 400A and may also be assigned a second SIP node identifier for its neighbor relationship with I-SBC 400C).

Provided that SIP node (e.g., I-SBC 400A) and the neighbor SIP node (e.g., I-SBC 400B) have each been assigned a respective SIP node identifier, both SIP nodes are now set to be able to form a neighbor relationship with one another. In some examples, the establishment of a neighbor relationship may include I-SBC 400A sending a first request to I-SBC 400B. As will be described in more detail below, the first request may, itself, be a SIP message. For example, as shown in FIG. 5, the first request may be formatted as a SIP SUBSCRIBE message 502. As shown, the I-SBC 400A may be configured to modify the SIP SUBSCRIBE message 502 to include the first SIP node identifier of the SIP Node 400A and a second SIP node identifier of the Neighbor SIP Node 400B. In particular, the SIP SUBSCRIBE message 502 may include a TO header 511 that is modified to include the second SIP node identifier of the Neighbor SIP Node 400B and also may include a FROM header 513 that is modified to include the first SIP node identifier of the SIP Node 400A.

In response to sending the SIP SUBSCRIBE message 502, the I-SBC 400A may receive a response message, which may also be a SIP message (e.g., see 200-level SIP response message 506 of FIG. 5). In some implementations, the response message indicates that I-SBC 400A is now subscribed to receive neighbor SIP node configurations of I-SBC 400B.

Furthermore, the neighbor SIP node (i.e., I-SBC 400B) may also generate a request message (e.g., SIP SUBSCRIBE message 508 that includes SIP node identifiers 515 and 517) in order for I-SBC 400B to subscribe to receive the SIP node configurations of I-SBC 400A. In some examples, I-SBC 400A may be configured to validate the authenticity of the request message (e.g., SIP SUBSCRIBE message 508) before sending the response message 512 (e.g., 200-level SIP response message). Thus, the response message 512 may indicate to the I-SBC 400B that the I-SBC 400B has been authenticated and that the I-SBC 400B is now subscribed to receive SIP node configurations of I-SBC 400A.

At this point both the I-SBC 400A and the I-SBC 400B have setup a SIP neighbor relationship with each other, and have also subscribed to receive each other's SIP node configurations. FIG. 6 illustrates the exchange of the actual SIP node configurations.

As shown in FIG. 6, I-SBC 400A may send its SIP node configurations as a SIP message. For example, as shown in FIG. 6, the SIP node configurations may be formatted as a SIP NOTIFY message 602. As shown, the I-SBC 400A may be configured to modify the SIP NOTIFY message 602 to include the first SIP node identifier of the I-SBC 400A and a second SIP node identifier of the I-SBC 400B. In addition, I-SBC 400A may be configured to generate and/or modify the SIP NOTIFY message 602 by inserting the SIP node configurations into a body of the SIP NOTIFY message 602. In some examples, the SIP node configurations may be inserted into the body of the SIP NOTIFY message 602 in an Extensible Markup Language (XML) format 611.

Any standard or custom/proprietary headers may be body of the SIP NOTIFY message 602. For example, the XML-formatted body of the SIP NOTIFY message may include one or more of the following SIP Headers: Accept, Accept-Contact, Accept-Encoding, Accept-Language, Accept-Resource-Priority, Alert-Info, Allow, Allow-Events, Answer-Mode, Authentication-Info, Authorization, Call-ID, Call-Info, Cellular-Network-Info, Contact, Content-Disposition, Content-Encoding, Content-Language, Content-Length, Content-Type, CSeq, Date, Encryption, Error-Info, Event, Expires, Feature-Caps, Flow-Timer, From, Geolocation, Geolocation-Error, Geolocation-Routing, Hide, History-Info, Identity, Identity-Info, In-Reply-To, Join, Max-Breadth, Max-Forwards, MIME-Version, Min-Expires, Min-SE, Organization, P-Access-Network-Info, P-Answer-State, P-Asserted-Identity, P-Asserted-Service, P-Associated-URI, P-Called-Party-ID, P-Charging-Function-Addresses, P-Charging-Vector, P-DCS-Trace-Party-ID, P-DCS-OSPS, P-DCS-Billing-Info, P-DCS-LAES, P-DCS-Redirect, P-Early-Media, P-Media-Authorization, P-Preferred-Identity, P-Preferred-Service, P-Private-Network-Indication, P-Profile-Key, P-Refused-URI-List, P-Served-User, P-User-Database, P-Visited-Network-ID, Path, Permission-Missing, Policy-Contact, Policy-ID, Priority, Priv-Answer-Mode, Privacy, Proxy-Authenticate, Proxy-Authorization, Proxy-Require, Rack Reason, Reason-Phrase, Record-Route, Recv-Info, Refer-Events-At, Refer-Sub, Refer-To, Referred-By, Reject-Contact, Relayed-Charge, Replaces, Reply-To, Request-Disposition, Require, Resource-Priority, Resource-Share, Response-Key, Restoration-Info, Retry-After, Route, RSeq, Security-Client, Security-Server, Security-Verify, Server, Service-Route, Session-Expires, Session-ID, SIP-ETag, SIP-If-Match, Subject, Subscription-State, Supported Suppress-If-Match, Target-Dialog, Timestamp, To, Trigger-Consent, Unsupported, User-Agent, User-to-User, Via Warning, and WWW-Authenticate.

In addition, the body of the SIP NOTIFY message 602 may also be formatted to include one or more of the following session description protocol (SDP) parameters: media, proto, SDP bwtype, nettype, addrtype, enckey, att-field (session level), att-field (both session and media level), att-field (media level only), att-field (source level), att-field (unknown level), content SDP Parameters, Semantics for the "group" SDP Attribute "rtcp-fb" Attribute Values "ack" and "nack" Attribute Values "depend" SDP Attribute Values "cs-correlation" Attribute Values Semantics for the "ssrc-group" SDP Attribute SDP/RTSP key management protocol identifiers Codec Control Messages, QoS Mechanism Tokens, SDP Capability Negotiation Option Tags, SDP Capability Negotiation Configuration Parameters Registry, Timestamp Reference Clock Source Parameters, Media Clock Source Parameters Multiplexing Categories,association-usage Name Registry, and RID Attribute Parameters.

In response to sending the SIP NOTIFY message 602, the I-SBC 400A may receive a response message, which may also be a SIP message (e.g., see 200-level SIP response message 606 of FIG. 6). In some implementations, the response message indicates that I-SBC 400B successfully received the SIP node configurations included in the SIP NOTIFY message 602.

Furthermore, the neighbor SIP node (i.e., I-SBC 400B) may also send its neighbor SIP node configurations to the I-SBC 400A. Similar to the SIP NOTIFY message 602, the I-SBC 400B may generate/modify a SIP NOTIFY message 608 to include the SIP node identifier of I-SBC 400B, the SIP node identifier of I-SBC 400A, as well as the neighbor SIP node configurations inserted into the body of the SIP NOTIFY message 608 in the XML format 611. In response to receiving the SIP NOTIFY message 608, the I-SBC 400A may extract the neighbor SIP node configurations and store them to a data store for use when formatting subsequent SIP message exchanged between the SIP node (i.e., I-SBC 400A) and the neighbor SIP node (i.e., I-SBC 400B). In some implementations, storing the neighbor SIP node configurations may include maintaining a signaling information base (SIB) that includes neighbor SIP node configurations for each neighbor SIP node that the I-SBC 400A has established a neighbor relationship with.

For example, the I-SBC 400A may build a SIP signaling plane/SIP information base (SIB) for each SIP neighbor similar to a router building a routing plane, using the configuration that was exchanged. The SIP nodes then will use the information in the SIB to construct SIP request and response messages for that particular neighbor. In a multiple SP environment, a SIP node may form 1:1 neighbor relationship with multiple SIP nodes.

As shown in FIG. 6, the I-SBC 400A may also send a response message (e.g., 200-level SIP response message 612) to acknowledge that I-SBC 400A has successfully received the neighbor SIP node configurations.

Figure 7:
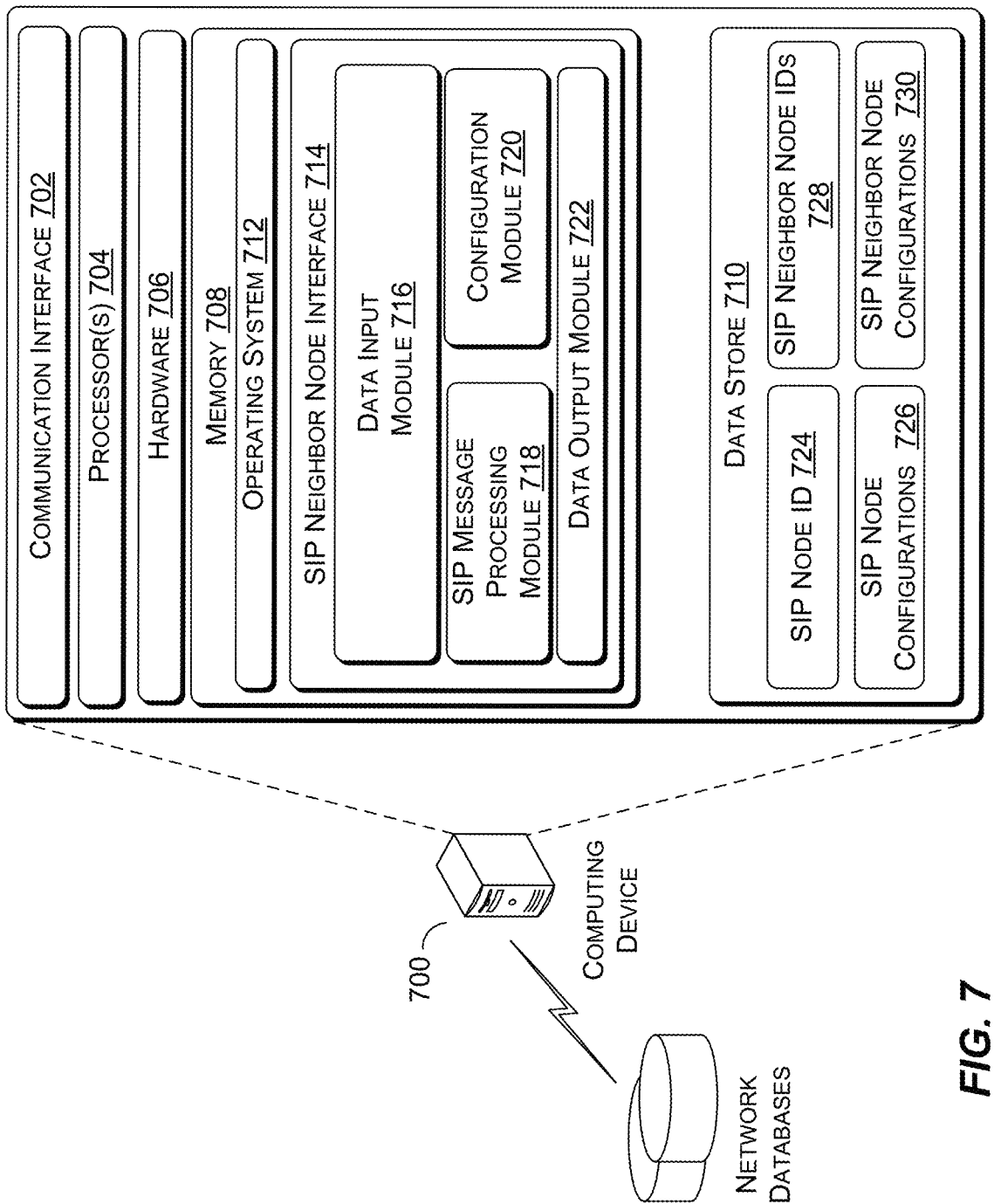
FIG. 7 is a block diagram of an example computing device for performing one or more of the processes described herein.

FIG. 7 is a block diagram of an example computing device 700 for performing one or more of the processes described herein. Computing device 700 is one possible implementation of any of the SBC's discussed herein (e.g., I-SBC 325 of FIG. 3 and/or I-SBCs 425A-C of FIGS. 4-6).

The computing device 700 may include a communication interface 702, one or more processors 704, hardware 706, and memory 708. The communication interface 702 may include wireless and/or wired communication components that enable the server to transmit data to and receive data from other networked devices. The hardware 706 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 708 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 704 and the memory 708 of the computing devices 700 may implement an operating system 712 and the SIP Neighbor Node Interface 714. The operating system 712 may include components that enable the computing devices 700 to receive and transmit data via various interfaces (e.g., user controls, communication interface, and/or memory input/output devices), as well as process data using the processors 704 to generate output. The operating system 712 may include a presentation component that presents the output (e.g., display the data on an electronic display, store the data in memory, transmit the data to another electronic device, etc.). Additionally, the operating system 712 may include other components that perform various additional functions generally associated with an operating system.

The SIP Neighbor Node Interface 714 may include a data input module 716, a SIP message processing module 718, a configuration module 720, and a data output module 722. The modules may include routines, program instructions, objects, and/or data structures that perform particular tasks or implement particular abstract data types. The computing device 700 may also include a data store 710 that is used by the SIP Neighbor Node Interface 714.

The data input module 716 may receive data that are inputted by a user via application user interfaces. The application user interfaces may be presented via the stand-alone application or a web browser executing on a computing device. The data may include various parameters, such as one or more of the SIP Node ID 724, and/or the SIP Node configurations 726.

The network databases may include one or more SIP Node databases. These databases may include information on the existence of one or more neighbor SIP nodes and/or their respective SIP node configurations.

The configuration module 720 may be configured to perform one or more operations discussed herein, such as the establishment of a neighbor relationship with one or more neighbor SIP nodes and/or the storing of received neighbor SIP node configurations 720 to the data store 710.

The SIP message processing module 718 may be configured to receive one or more SIP message from a corresponding core network (e.g., core network 140 of FIG. 1), determine an appropriate neighbor SIP node for forwarding the SIP message to, and also for modifying and/or formatting the SIP message according to the corresponding SIP Neighbor node configurations 730 included in the data store 710.

The data store 710 may store information that is processed by the SIP Neighbor Node Interface 714. The information may include the SIP node ID 724 (i.e., SIP node ID of computing device 700), the SIP node configurations 726 (i.e., the SIP node configurations of computing device 700), the SIP neighbor Node IDs 728 (i.e., the SIP neighbor node IDs of I-SBC 425B and/or I-SBC 425C), and the SIP neighbor node configurations 730 (i.e., the respective SIP neighbor node configurations of I-SBC 400B and/or I-SBC 400C).

Figure 8:
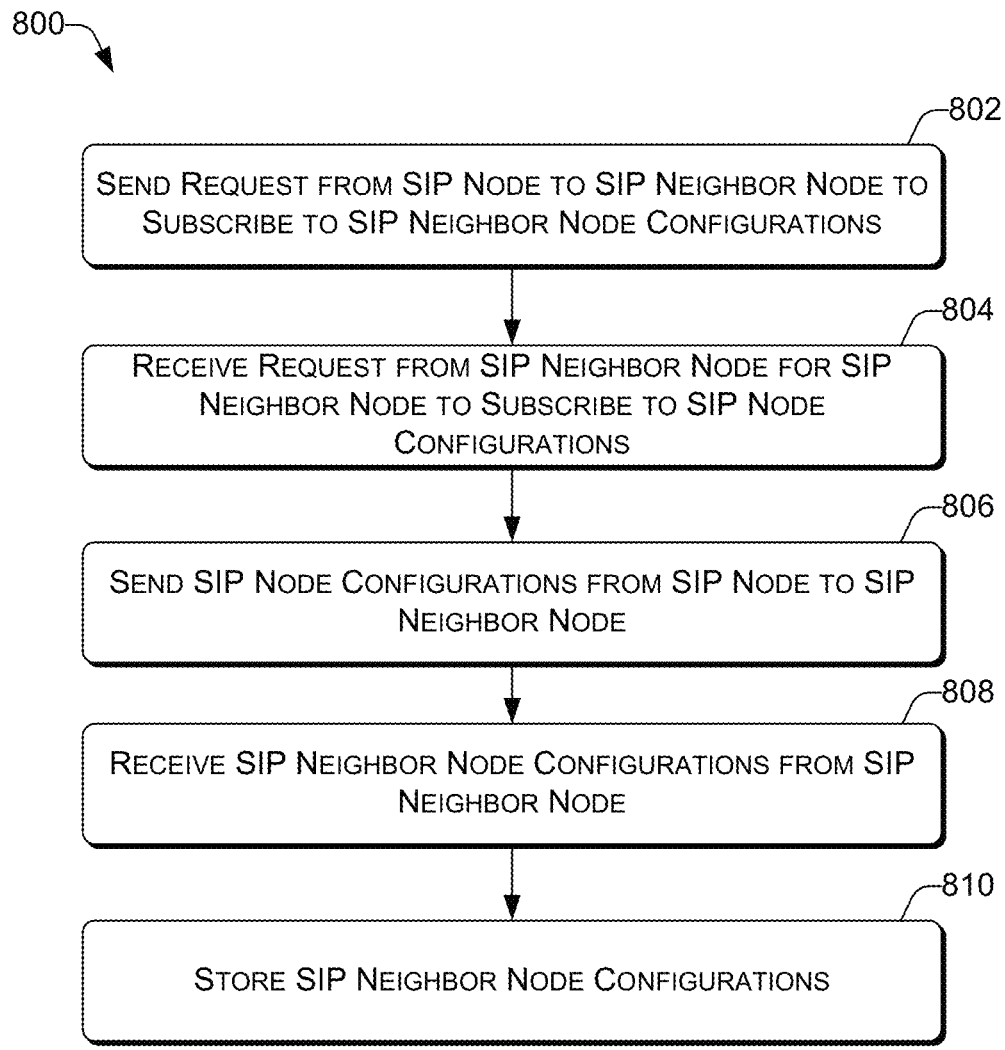
FIG. 8 is a flow diagram of an example process for establishing a SIP neighbor relationship between SIP nodes.

FIG. 8 is a flow diagram of an example process 800 for establishing a SIP neighbor relationship between SIP nodes. Process 800 is one possible process performed by computing device 700 of FIG. 7. In a process block 802, the configuration module 720 of the SIP Neighbor Node interface 714 may send a request (e.g., SIP SUBSCRIBE message 502) from the SIP node (e.g., I-SBC 400A) to subscribe to SIP neighbor node configurations of a neighbor SIP node (e.g., I-SBC 400B). In a process block 804, the configuration module 720 may receive a request (e.g., SIP SUBSCRIBE message 508) from the neighbor SIP node (i.e., I-SBC 400B) for the neighbor SIP node to subscribe to SIP node configurations of the SIP node (i.e., SIP node configurations of I-SBC 400A).

Next, in a process block 806, the configuration module 720 may send its SIP node configurations (e.g., SIP node configurations 726) to the neighbor SIP node (e.g., see SIP NOTIFY message 602 of FIG. 6). In a process block 808, the configuration module 720 receives the neighbor SIP node configurations and then stores those neighbor SIP node configurations 730 to the data store 710 (i.e., process block 810).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for dynamically exchanging session initiation protocol (SIP) configurations between a SIP node and a neighbor SIP node, the method comprising:
   sending a first SIP SUBSCRIBE message from the SIP node to the neighbor SIP node to subscribe to neighbor SIP node configurations that specify configuration requirements for SIP messages received by the neighbor SIP node;
   receiving a second SIP SUBSCRIBE message from the neighbor SIP node for the neighbor SIP node to subscribe to SIP node configurations that specify configuration requirements for SIP messages received by the SIP node;
   sending a first SIP NOTIFY message that includes the SIP node configurations from the SIP node to the neighbor SIP node;
   receiving a second SIP NOTIFY message that includes the neighbor SIP node configurations from the neighbor SIP node;
   storing the neighbor SIP node configurations to a signaling information base (SIB) for modifying subsequent SIP messages exchanged between the SIP node and the neighbor SIP node, the signaling information database identifying a plurality of neighbor SIP nodes and respective neighbor SIP node configurations;
   receiving a SIP message at the SIP node from a core network associated with the SIP node;
   identifying the neighbor SIP node from among the plurality of neighbor SIP nodes for forwarding the SIP message;
   based on identifying the neighbor SIP node, accessing, from the signaling information base, the neighbor SIP node configurations associated with the neighbor SIP node;
   before sending the SIP message to the neighbor SIP node, modifying the SIP message according to the neighbor SIP node configurations associated with the neighbor SIP node and from the signaling information base by modifying a SIP header and a SIP parameter of the SIP message according to the neighbor SIP node configurations;
   sending the modified SIP message to the neighbor SIP node;
   assigning a unique SIP node identifier to the SIP node for each neighbor SIP node identified in the signaling information database; and
   including the unique SIP node identifier in SIP messages from the SIP node to the corresponding one of the neighbor SIP nodes identified in the signaling information database.

2. The computer-implemented method of claim 1, further comprising:
   modifying the first SIP SUBSCRIBE message to include a first SIP node identifier of the SIP node and a second SIP node identifier of the neighbor SIP node.

3. The computer-implemented method of claim 2, wherein the first SIP SUBSCRIBE message comprises a TO header for identifying a recipient of the first SIP SUBSCRIBE message and a FROM header for identifying an originator of the first SIP SUBSCRIBE message, the method further comprising:
   modifying the TO header to include the second SIP node identifier of the neighbor SIP node; and
   modifying the FROM header to include the first SIP node identifier of the SIP node.

4. The computer-implemented method of claim 1, further comprising:
   receiving a response message from the neighbor SIP node in response to sending the first SIP SUBSCRIBE message, wherein the response message indicates that the SIP node is subscribed to receive the neighbor SIP node configurations.

5. The computer-implemented method of claim 1, further comprising:
   authenticating the neighbor SIP node in response to receiving the second SIP SUBSCRIBE message; and
   sending a response message to the neighbor SIP node in response to authenticating the neighbor SIP node, wherein the response message indicates that the neighbor SIP node is subscribed to receive the SIP node configurations.

6. The computer-implemented method of claim 5, wherein the response message comprises an additional SIP message.

7. The computer-implemented method of claim 6, wherein the additional SIP message comprises a 200-level SIP response message.

8. The computer-implemented method of claim 1, wherein sending the first SIP NOTIFY message that includes the SIP node configurations from the SIP node to the neighbor SIP node comprises:
   generating the first SIP NOTIFY message to include the SIP node configurations.

9. The computer-implemented method of claim 8, wherein generating the first SIP NOTIFY message comprises inserting the SIP node configurations into a body of the SIP message in an Extensible Markup Language (XML) format.

10. The computer-implemented method of claim 1, further comprising:
determining that the SIP header and the SIP parameter of the SIP message do not comply with the requirements for SIP messages received by the neighbor SIP node as specified in the neighbor SIP node configurations,
wherein modifying the SIP message according to the neighbor SIP node configurations is based on determining that the SIP header and the SIP parameter of the SIP message do not comply with the requirements for SIP messages received by the neighbor SIP node as specified in the neighbor SIP node configurations.

11. One or more non-transitory computer-readable media storing computer-executable instructions, which when executed by at least one processor of a computing device, direct the computing device to:
send a first SIP SUBSCRIBE message from a session initiation protocol (SIP) node to a neighbor SIP node to subscribe to neighbor SIP node configurations that specify configuration requirements for SIP messages received by the neighbor SIP node;
receive a second SIP SUBSCRIBE message from the neighbor SIP node for the neighbor SIP node to subscribe to SIP node configurations that specify configuration requirements for SIP messages received by the SIP node;
send a third SIP NOTIFY message that includes the SIP node configurations from the SIP node to the neighbor SIP node;
receive a fourth SIP NOTIFY message that includes the neighbor SIP node configurations from the neighbor SIP node;
store the neighbor SIP node configurations to a signaling information base (SIB) for modifying subsequent SIP messages exchanged between the SIP node and the neighbor SIP node, the signaling information database identifying a plurality of neighbor SIP nodes and respective neighbor SIP node configurations;
receive a fifth SIP message at the SIP node from a core network associated with the SIP node;
identify the neighbor SIP node from among the plurality of neighbor SIP nodes for forwarding the fifth SIP message;
based on identifying the neighbor SIP node, access, from the signaling information base, the neighbor SIP node configurations associated with the neighbor SIP node
before sending the fifth SIP message to the neighbor SIP node, modify the fifth SIP message according to the neighbor SIP node configurations associated with the neighbor SIP node and from the signaling information base by modifying a SIP header and a SIP parameter of the fifth SIP message according to the neighbor SIP node configurations;
send the modified fifth SIP message to the neighbor SIP node;
assign a unique SIP node identifier to the SIP node for each neighbor SIP node identified in the signaling information database; and
include the unique SIP node identifier in SIP messages from the SIP node to a corresponding one of the neighbor SIP nodes identified in the signaling information database.

12. The one or more non-transitory computer-readable media of claim 11, wherein the instructions to send the first SIP SUBSCRIBE message further comprise instructions to direct the computing device to:
generate the first SIP SUBSCRIBE message;
modify a FROM header of the first SIP SUBSCRIBE message to include a first SIP node identifier of the SIP node; and
modify a TO header of the first SIP SUBSCRIBE message to include a second SIP node identifier of the neighbor SIP node.

13. The one or more non-transitory computer-readable media of claim 11, wherein the instructions to send the third SIP NOTIFY message that includes the SIP node configurations further comprises instructions to direct the computing device to:
generate the third SIP NOTIFY message; and
insert the SIP node configurations into a body of the third SIP NOTIFY message in an Extensible Markup Language (XML) format.

14. A session border controller (SBC) of a session initiation protocol (SIP) node, the SBC of the SIP node, comprising:
at least one processor; and
at least one memory coupled to the at least one processor, the at least one memory having instructions stored therein, which when executed by the at least one processor, direct the SBC to:
send a first SIP SUBSCRIBE message from the SBC of the SIP node to an SBC of a neighbor SIP node to subscribe to neighbor SIP node configurations that specify configuration requirements for SIP messages received by the neighbor SIP node;
receive a second SIP SUBSCRIBE message from the SBC of the neighbor SIP node for the neighbor SIP node to subscribe to SIP node configurations that specify configuration requirements for SIP messages received by the SIP node;
send a third SIP NOTIFY message that includes the SIP node configurations from the SBC of the SIP node to the SBC of the neighbor SIP node;
receive a fourth SIP NOTIFY message that includes the neighbor SIP node configurations from the SBC of the neighbor SIP node;
store the neighbor SIP node configurations to a data store for modifying subsequent SIP messages exchanged between the SBC of the SIP node and the SBC of the neighbor SIP node;
store the neighbor SIP node configurations to a signaling information base (SIB) for modifying subsequent SIP messages exchanged between the SBC of the SIP node and the SBC of the neighbor SIP node, the signaling information database identifying a plurality of neighbor SIP nodes and respective neighbor SIP node configurations;
receive a fifth SIP message at the SIP node from a core network associated with the SIP node;
identify the neighbor SIP node from among the plurality of neighbor SIP nodes for forwarding the fifth SIP message;
based on identifying the neighbor SIP node, access, from the signaling information base, the neighbor SIP node configurations associated with the neighbor SIP node
before sending the SIP message to the neighbor SIP node, modify the fifth SIP message according to the neighbor SIP node configurations associated with the neighbor SIP node and from the signaling information base by modifying a SIP header and a SIP parameter of the SIP message according to the neighbor SIP node configurations;
send the modified fifth SIP message from the SBC of the SIP node to an SBC of the neighbor SIP node;
assign a unique SIP node identifier to the SIP node for each neighbor SIP node identified in the signaling information database; and
include the unique SIP node identifier in SIP messages from the SBC of the SIP node to a corresponding one of the neighbor SIP nodes identified in the signaling information database.

15. The SBC of claim 14, wherein the instructions to send the first SIP SUBSCRIBE message further comprise instructions to direct the SBC of the SIP node to:
generate the first SIP SUBSCRIBE message;
modify a FROM header of the first SIP SUBSCRIBE message to include a first SIP node identifier of the SBC of the SIP node; and
modify a TO header of the first SIP SUBSCRIBE message to include a second SIP node identifier of the SBC of the neighbor SIP node.

16. The SBC of claim 14, wherein the instructions to send the third SIP NOTIFY message that includes the SIP node configurations further comprise instructions to direct the SBC of the SIP node to:
generate the third SIP NOTIFY message; and
insert the SIP node configurations into a body of the third SIP NOTIFY message in an Extensible Markup Language (XML) format.

\* \* \* \* \*